(12) United States Patent
Herrmann et al.

(10) Patent No.: US 10,797,284 B2
(45) Date of Patent: Oct. 6, 2020

(54) ELECTRIC VEHICLE BATTERY CELL WITH POLYMER FRAME FOR BATTERY CELL COMPONENTS

(71) Applicants: Volkswagen AG, Wolfsburg (DE); AUDI AG, Ingolstadt (DE); Dr. Ing. h.c. F. Porsche AG, Stuttgart (DE)

(72) Inventors: Mirko Herrmann, Mountain View, CA (US); Angela Speidel, Mountain View, CA (US)

(73) Assignees: VOLKSWAGEN AG, Wolfsburg (DE); AUDI AG, Ingolstadt (DE); DR. ING. H.C. F. PORSCHE AG, Stuttgart (DE)

( * ) Notice: Subject to any disclaimer, the term of this patent is extended or adjusted under 35 U.S.C. 154(b) by 268 days.

(21) Appl. No.: 15/432,401

(22) Filed: Feb. 14, 2017

(65) Prior Publication Data

US 2018/0233721 A1 Aug. 16, 2018

(51) Int. Cl.
*H01M 2/00* (2006.01)
*H01M 2/10* (2006.01)
(Continued)

(52) U.S. Cl.
CPC ....... *H01M 2/1094* (2013.01); *H01M 2/1077* (2013.01); *H01M 10/044* (2013.01);
(Continued)

(58) Field of Classification Search
CPC ............. H01M 2/1094; H01M 2/1077; H01M 2220/20; B60L 11/18
See application file for complete search history.

(56) References Cited

U.S. PATENT DOCUMENTS

| 3,819,412 A | 6/1974 | Taylor et al. |
| 4,164,068 A | 8/1979 | Shropshire et al. |

(Continued)

FOREIGN PATENT DOCUMENTS

| CA | 2835915 A1 | 11/2012 |
| CN | 1912522 | 2/2007 |

(Continued)

OTHER PUBLICATIONS

Definition of fixedly, www.dictionary.com, Oct. 23, 2018 (Year: 2018).

(Continued)

*Primary Examiner* — Cynthia H Kelly
*Assistant Examiner* — Monique M Wills
(74) *Attorney, Agent, or Firm* — Davidson, Davidson & Kappel, LLC

(57) ABSTRACT

A battery component includes a polymer frame having at least one window, the polymer frame having a first planar side and an opposite second planar side, and a window edge between the first and second planar sides. The battery component also has a battery cell component having a separator and bipolar current collector, the battery cell component being attached to the frame, the separator or bipolar current collector being attached to the first planar side or the window edge. A battery stack, a method for handling the battery component as an individual unit are also provided, electric vehicle battery and electric vehicle are also provided.

37 Claims, 4 Drawing Sheets

(51) Int. Cl.
*H01M 10/04* (2006.01)
*H01M 4/70* (2006.01)
*H01M 2/18* (2006.01)
*B60L 50/64* (2019.01)

(52) U.S. Cl.
CPC ... *H01M 10/0418* (2013.01); *H01M 10/0486* (2013.01); *B60L 50/64* (2019.02); *H01M 2/18* (2013.01); *H01M 4/70* (2013.01); *H01M 2220/20* (2013.01)

(56) References Cited

U.S. PATENT DOCUMENTS

| | | | |
|---|---|---|---|
| 4,539,268 A | | 9/1985 | Rowlette et al. |
| 4,576,881 A | | 3/1986 | Hasenauer et al. |
| 4,737,257 A | | 4/1988 | Boulton |
| 5,518,839 A | * | 5/1996 | Olsen .................. H01M 4/661 429/231.3 |
| 5,618,641 A | | 4/1997 | Arias et al. |
| 5,688,615 A | * | 11/1997 | Mrotek .................. H01M 2/08 429/210 |
| 6,022,642 A | | 2/2000 | Tsukamoto et al. |
| 6,743,546 B1 | * | 6/2004 | Kaneda ................ H01M 2/021 429/127 |
| 7,097,937 B2 | | 8/2006 | Fredriksson et al. |
| 7,824,806 B2 | | 11/2010 | Visco et al. |
| 2002/0192542 A1 | | 12/2002 | Luski et al. |
| 2003/0013012 A1 | | 1/2003 | Ahn et al. |
| 2003/0194605 A1 | * | 10/2003 | Fauteux .................. H01M 2/26 429/149 |
| 2004/0067417 A1 | | 4/2004 | Oosawa et al. |
| 2004/0253512 A1 | | 12/2004 | Watanabe et al. |
| 2005/0089751 A1 | | 4/2005 | Oogami et al. |
| 2006/0134502 A1 | | 6/2006 | Garceau et al. |
| 2008/0003493 A1 | | 1/2008 | Bates et al. |
| 2009/0233164 A1 | | 9/2009 | Shimamura et al. |
| 2011/0014520 A1 | | 1/2011 | Ueda |
| 2011/0206974 A1 | | 8/2011 | Inoue |
| 2011/0217595 A1 | | 9/2011 | Kelnberger |
| 2011/0308935 A1 | | 12/2011 | Yamazaki et al. |
| 2012/0115020 A1 | | 5/2012 | Hwang |
| 2013/0101878 A1 | | 4/2013 | Pilgram |
| 2013/0108899 A1 | | 5/2013 | Schaefer |
| 2013/0157111 A1 | | 6/2013 | Chami |
| 2013/0162216 A1 | | 6/2013 | Zhamu et al. |
| 2013/0302695 A1 | | 11/2013 | Beer et al. |
| 2014/0045040 A1 | | 2/2014 | Chami |
| 2014/0178745 A1 | | 6/2014 | Kwon et al. |
| 2014/0329126 A1 | * | 11/2014 | Ho .......................... H01M 4/13 429/128 |
| 2014/0363748 A1 | * | 12/2014 | Kritzer ................ H01M 8/0273 429/409 |
| 2015/0093627 A1 | | 4/2015 | Busch et al. |
| 2015/0280177 A1 | | 10/2015 | Keates |
| 2016/0104913 A1 | | 4/2016 | Moreau |
| 2016/0141623 A1 | | 5/2016 | Yoon et al. |
| 2016/0156065 A1 | | 6/2016 | Visco et al. |
| 2016/0329535 A1 | | 11/2016 | Moomaw et al. |
| 2017/0263951 A1 | * | 9/2017 | Kanno .................. H01M 8/188 |
| 2017/0294662 A1 | * | 10/2017 | Madden .............. H01M 8/0258 |
| 2017/0294672 A1 | | 10/2017 | Warrington |
| 2018/0233721 A1 | | 8/2018 | Herrmann et al. |
| 2018/0233752 A1 | | 8/2018 | Herrmann et al. |
| 2018/0233768 A1 | | 8/2018 | Herrmann et al. |
| 2018/0233782 A1 | | 8/2018 | Herrmann et al. |
| 2019/0044129 A1 | * | 2/2019 | Yadav .................... H01M 2/08 |

FOREIGN PATENT DOCUMENTS

| | | |
|---|---|---|
| CN | 103334147 | 10/2013 |
| DE | 102010013031 A1 | 9/2011 |
| DE | 102011003186 | 7/2012 |
| DE | 102011003186 A1 | 7/2012 |
| DE | 102012213110 A1 | 1/2014 |
| DE | 102015102688 A1 | 10/2015 |
| DE | 102015210806 A1 | 5/2016 |
| EP | 1487034 A2 | 12/2004 |
| EP | 1841001 | 10/2007 |
| EP | 2609643 | 3/2012 |
| EP | 2804697 A1 | 7/2013 |
| GB | 2477552 | 8/2011 |
| JP | 2005259379 | 9/2005 |
| JP | 2010277811 | 12/2010 |
| KR | 20080036139 A | 4/2008 |
| WO | WO9210861 | 6/1992 |
| WO | WO 1997038461 A1 | 10/1997 |
| WO | WO01/59869 | 8/2001 |
| WO | WO2006061696 | 6/2006 |
| WO | WO2009029746 | 3/2009 |
| WO | WO 2010049478 A1 | 5/2010 |
| WO | WO2010124195 A1 | 10/2010 |
| WO | WO 2011134613 | 11/2011 |
| WO | WO 2011134613 A1 | 11/2011 |
| WO | WO2013109641 | 7/2013 |
| WO | WO 2013131624 A1 | 9/2013 |
| WO | WO2015083825 | 6/2015 |
| WO | WO2016/057457 | 4/2016 |

OTHER PUBLICATIONS

Definition of connected, www.bing.com 10/2312018 (Year: 2018).
Key technologies for electric motorization, downloaded from http://www.toyota-global.com/innovation/environmental_technology/keytech/, 5 pages, downloaded on Feb. 14, 2017.

* cited by examiner

ELECTRIC VEHICLE BATTERY CELL WITH POLYMER FRAME FOR BATTERY CELL COMPONENTS

FIELD OF THE INVENTION

The present invention relates generally to electric vehicles and more particularly to batteries for electric vehicles.

BACKGROUND

U.S. Patent Application Publication No. 2013/0157111 discloses a casing for a lithium bipolar electrochemical battery including a bipolar element. The casing includes a composite material including a matrix and at least one porous reinforcement, the matrix of which includes at least one hardened polymer impregnating the at least one porous reinforcement, wherein the at least one porous reinforcement and the at least one hardened polymer encase the bipolar element and maintain a determined pressure on either side of the bipolar element to maintain a determined contact between its constituents. The bipolar element includes lower and upper electrodes separated from a bipolar electrode by two separators, in which an electrolyte is present in a liquid or gel form. Sealing against the electrolytes of the battery between two constituted adjacent electrochemical cells is provided by a seal which is produced by deposition of resin or adhesive on the periphery of all the electrodes.

U.S. Patent Application No. 2013/0101878 discloses a battery comprising a plurality of self-contained, substantially cuboid cell housings, in each of which a side face is formed at least in some regions as a negative pole and the opposite side face is designed at least in some regions as a positive pole. The cell housings bear against one another, with the pole on the pole, and extend between a positive contact and a negative contact, and wherein the cell housings are each enclosed by an electrically non-conductive, mechanically supporting frame. The cell housing is filled with electrolyte on both sides of a bimetal.

U.S. Patent Application No. 2004/0253512 discloses a bipolar battery including a bipolar electrode and an electrolyte layer. The bipolar electrode includes a current collector, a positive electrode layer formed on one surface of the current collector, and a negative electrode layer formed on the other surface of the current collector. The bipolar electrode is sequentially laminated to provide connection in series via the electrolyte layer to form a stack structure. The positive electrode layer, the negative electrode layer and the electrolyte layer are potted with a resin portion. A polymer gel electrolyte can include a solid polymer electrolyte with an ion conductivity.

U.S. Patent Application No. 2003/0013012 discloses an electrochemical element comprising electrochemical cells which are multiply stacked. The electrochemical cells are formed by stacking: i) a bicell having a cathode; a separator layer; an anode; another separator layer; and another cathode sequentially as a basic unit; or ii) a bicell having an anode; a separator layer; a cathode; another separator layer; and another anode sequentially as a basic unit. A separator film is interposed between each of the stacked bicells.

U.S. Patent Application No. 2016/0141623 discloses a bipolar electrode having a solid electrolyte, an anode slurry and a cathode slurry, each of which may be provided on a first surface and a second surface of the solid electrolyte, respectively, spacers provided in the anode slurry and the cathode slurry, and a metal substrate provided on the anode slurry and the cathode slurry. The electrode can be dried and pressed, and stacked to form an all-solid state battery.

SUMMARY OF THE INVENTION

The present invention provides a battery component comprising:

a polymer frame having a window, the polymer frame having a first planar side and an opposite second planar side, and a window edge between the first and second planar sides; and a battery cell component having a separator and a bipolar current collector, the separator or bipolar current collector being attached to the first planar side or the window edge of the frame.

The present invention advantageously creates a battery component that is well protected, easily handled and easy to assemble.

The polymer frame can for example be a rigid structure or a dense foil, perforated foil, porous foil, adhesive tape or adhesive foil, and may be for example be made of polyethylene, polypropylene or a mixture of the two.

The polymer frame can be attached at the separator with an overlap of 0 to 50%. With 0% overlap, the separator is attached solely at the window edge, and from more than 0% to 50%, the separator is attached at one side to the first planar side, so that up to 50% of an area of the first planar side is covered by the separator.

The polymer frame may have further windows, for up to twenty total windows, with a total of one to five windows preferred, and most preferred being one window.

The polymer frame can be attached via gluing, welding, heat bonding, lamination or with an additional adhesive tape to the separator, or via a friction fit, for example via the separator itself or with an electrode attached to the separator and fitting tightly into the frame.

A second polymer frame may be provided on another side of the separator, resulting in a polymer frame—separator—second polymer frame unit.

If attached to the bipolar current collector, the bipolar current collector can be attached to the frame for example by gluing, welding heat bonding, lamination or adhesive tape. Advantageously, a nickel-coated side of an aluminum bipolar current collector can be attached directly to the frame.

The polymer frame window can have the shape of a rectangle, a rectangle with rounded edges, a circle, an oval or a triangle. Preferred are rectangle or a rectangle with rounded edges.

The battery cell component preferably includes at least one electrode attached to the separator, for example in the form of a film.

The polymer frame for example may have at least one feed hole, most preferably four, that for example can fit over rods to aid in processing the stack.

The present invention thus can also provide a battery stack comprising a housing and a plurality of the battery components with the electrode. The polymer frames of the battery components easily be attached directly at the housing, for example via gluing, welding or lamination. A liquid electrolyte advantageously can be added after each polymer frame is attached to the housing.

The battery cell component can include the separator with an anode and cathode film on each side, and the bipolar current collector. The battery components, which are then fully solid can be stacked together first and then attached to a housing.

The present invention advantageously can increase the battery mechanical stability, especially at the battery cell edges, and also can enable a separation of anode and cathode compartments.

The present invention also allows easy handling of the battery cell components, such as brittle electrode material attached to the separator, and thus also provides a method for handling battery components comprising moving the battery component of the present invention as an individual component via the polymer frame.

BRIEF DESCRIPTION OF THE DRAWINGS

The following describe several nonlimiting embodiments of the present invention, in which.

DETAILED DESCRIPTION OF THE PREFERRED EMBODIMENTS

Figure 1:
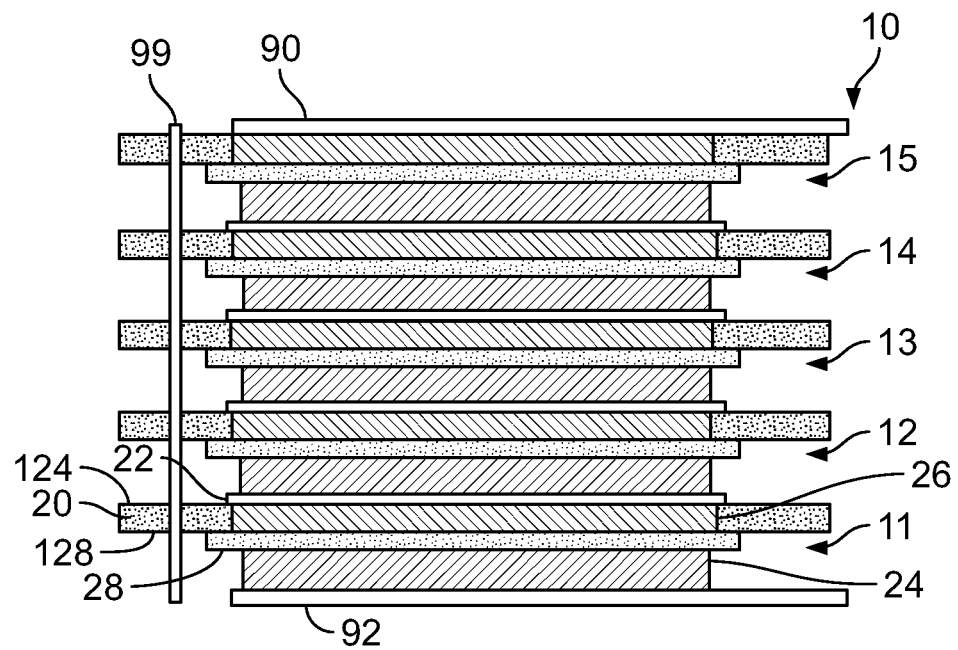
FIG. 1 shows a side view of a plurality of stacked battery components in a first embodiment of the present invention.

FIG. 1 shows a battery cell module 10 with five stackable battery components 11, 12, 13, 14, 15 having electrode components according to an embodiment of the present invention.

Each battery component 11, 12, 13, 14, 15 includes an anode 24, a separator 28, a cathode 26 and a bipolar current collector 22. Each component also includes a polymer frame 20, which on a planar side 124 has the bipolar current collector 22 and on an opposite planar side 128 has the separator 28. Polymer frame 20 in this embodiment is a polymer foil, and the attachment of separator 28 to frame 20 will be described in more detail with respect to FIGS. 3a, 3b and 3c.

Separator 28 can be a dielectric material, for example a porous polyethylene or polyethylene-polypropylene foil (typically 8 to 25 μm thickness).

Polymer frame 20 can be made for example of polypropylene (PP), polyethylene (PE), acrylnitrile butadiene-styrene (ABS), polyamide (PA), polylactic acid (PLA), poly (methyl methacrylate) (PMMA), polycarbonate (PC), polyethylene terephthalate (PET), polystyrene (PS), polyvinyl chloride (PVC), polyphenylene sulfide (PPS), polyphenylene oxide (PPO), Polyetherimide (PEI), polyether ether ketone (PEEK), polyether sulfone (PES), polybenzimidazole (PBI), nylon and composite foil or multilayer foil made of aluminum foil coated with a polymer for example polypropylene. Most preferably, the polymer frame is a PE/PP mixture.

While typical electrolytes such as liquids or gels may be used, the present invention also can incorporate solid-state electrolytes like lithium oxide or sulfide glasses or glass ceramics or ceramics as electrolytes, and this solid state electrolyte can function as the separator. Bipolar current collector 22 can be made of copper or aluminum or nickel-coated aluminum or nickel for example. Anode 24 and cathode 26 can be deposited for example by vapor deposition or other film technology on separator 28. Bipolar current collector 22 can be connected to cathode 26 as described below.

Figure 2:
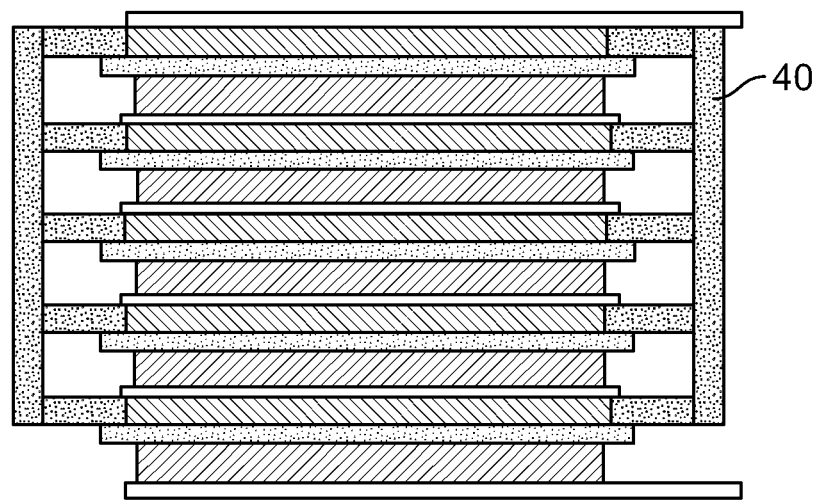
FIG. 2 shows a side view of the embodiment of FIG. 1 with a housing connected to the polymer frames of the battery components to form a battery module cell.

FIG. 2 shows a side view of the embodiment of FIG. 1 with a housing 40 connected to the polymer frames 20 of the battery components 11 to 15 to form a battery module cell. The housing can have for example four walls to cover each side of polymer frames 20, which preferably have a rectangular outer shape.

Housing 40 may be made of the same material as polymer frames 20 for example, or of a different polymer material.

A rod 99 as shown in FIG. 1 can interact with feed holes in the polymer frames 20 as will be described, and can be removed after the stack is created and the housing is added.

Figure 3A:
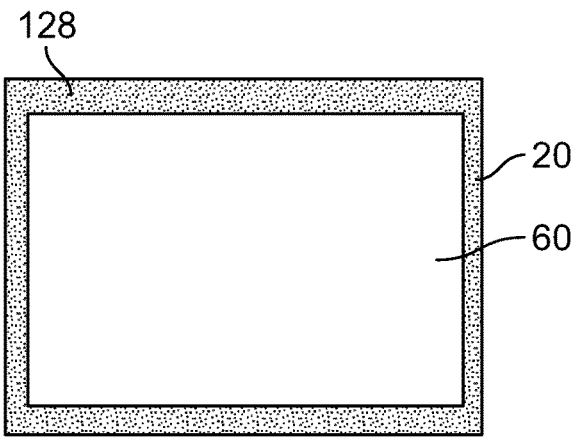
FIGS. 3a, 3b, 3c show a top view of creation of the embodiment of the battery component of the present invention.
Figure 3B:
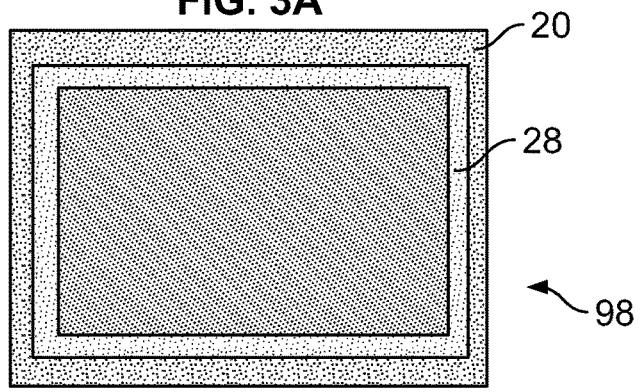
Figure 3C:
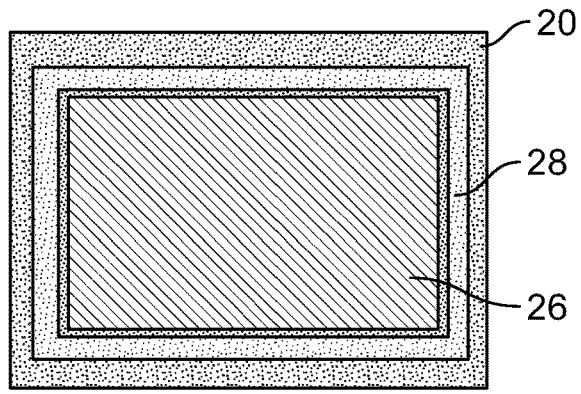
Figure 3D:
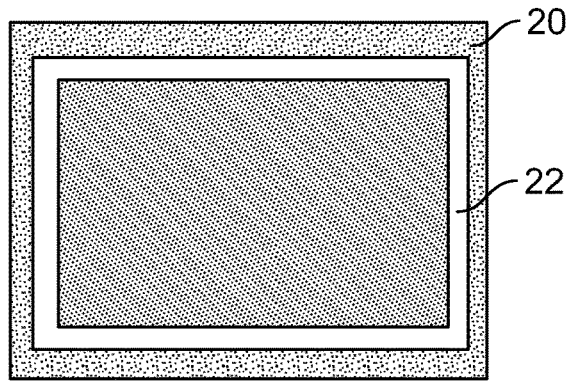
FIG. 3d shows an alternate embodiment of the battery component.

FIGS. 3a, 3b and 3c show a top view of creation of the embodiment of the battery component of the present invention, and FIG. 3d shows an alternate battery component with the bipolar current collector 22 first connected to the polymer frame.

FIG. 3a shows a side 128 of a polymer frame 20 with a rectangular window 60.

As shown in FIG. 3b, frame 20 can be placed over separator 28, which can have an anode 24 on one side and cathode 26 on the other side as shown in FIG. 1. Cathode 26 protrudes through window 60, as shown in FIG. 3c. Bipolar current collector 22, which can be a thin metal foil, then can be added over cathode 26 and attached to the frame 20 at its edges. Frame 20 likewise is attached to separator 28 around window 60.

Frame 20 and separator 28, fixedly connected, thus create an easily stackable battery component 98. Bipolar current collector 22, anode 24 and cathode 26 can be connected to this stackable component as discussed above or also can added separately or later during assembly.

The anode and the cathode advantageously can be made of polymer, glass, glassceramic or ceramic solid-state materials, and the mechanical properties are improved and much of the mechanical stress during the cell assembly process can be retained by the polymer frame, which lowers the requirements on the assembly process. In addition, small imperfections at the solid-state material edges can be tolerated and the amount of defective goods can be decreased.

FIG. 3d shows an alternate embodiment which starts out with the same frame 20 as in FIG. 3a. Bipolar current collector 22, which can be a thin foil of aluminum coated with nickel, is placed nickel side down on the frame to overlap side 128. Gluing or other bonding can be used to attach the nickel coating to a PP/PE frame, which advantageously provides a stable connection compared to a PP/PE aluminum or copper connection. The thin foil of the current collector 22 is also stabilized well, and then the cathode 26, separator 28 and anode 24 can be added separately to the combined frame 20/current collector 22 component.

Figure 4A:
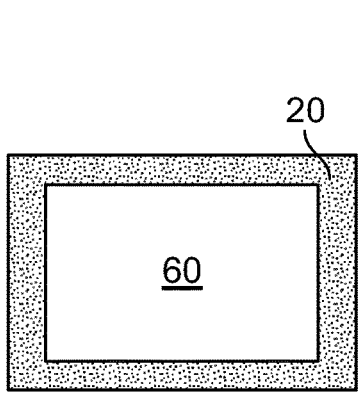
FIGS. 4a, 4b, 4c, 4d, 4e and 4f show various frame geometries of the polymer frame according to the present invention.
Figure 4B:
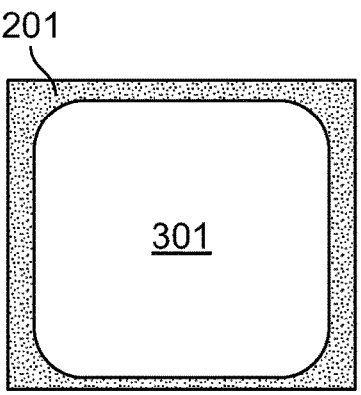
Figure 4C:
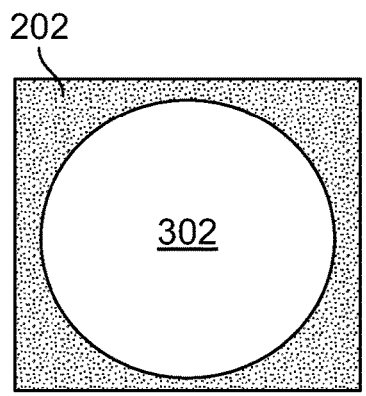
Figure 4D:
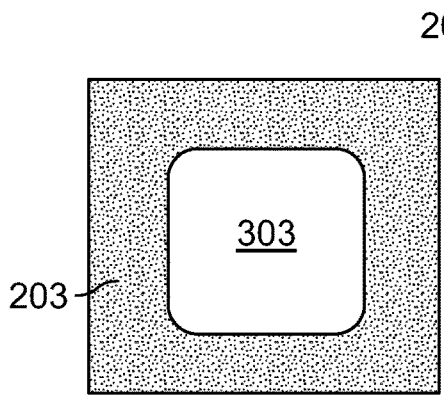
Figure 4E:
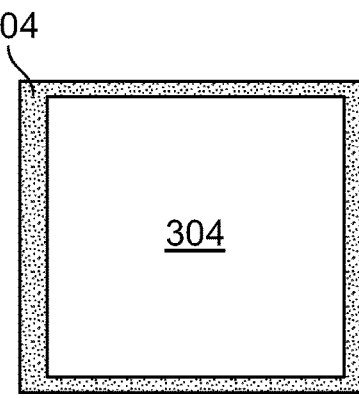
Figure 4F:
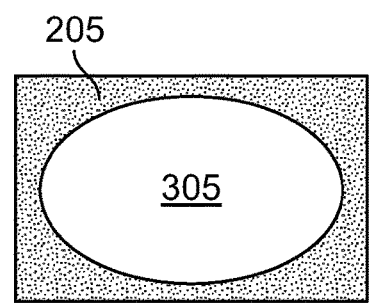

FIGS. 4a, 4b, 4c, 4d, 4e and 4f show various frame geometries of the polymer frames according to the present invention, with FIG. 4a being similar to FIG. 3a, and frames 201, 202, 203, 204, 205 having a window 301 with rounded edges, a circular window 302, a window 303 similar to window 301 but smaller for a same outer sized frame, a perfectly square window 304 and an oval window 305, respectively.

Figure 4G:
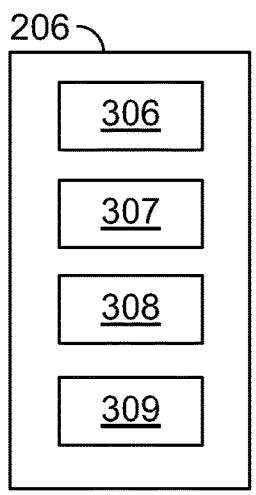
FIG. 4g shows a frame with a plurality of windows.

FIG. 4g shows a polymer frame 206 with for example four windows 306, 307, 308, 309.

Figure 5:
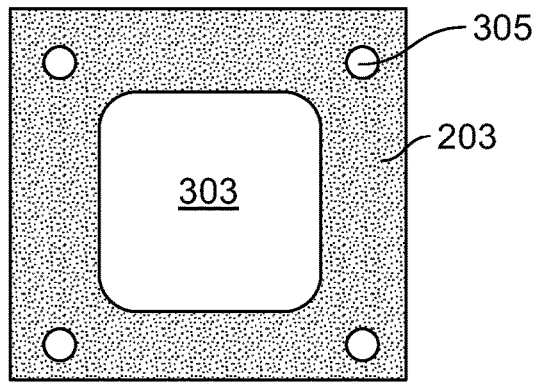
FIG. 5 shows a polymer frame according to the present invention with feed holes for easing assembly.

FIG. 5 shows a polymer frame 203 according to the present invention with feed holes 305 for easing assembly.

Assembly of the FIG. 1 embodiment can occur as follows: endplate anode current collector 92 is provided, and then battery component 11 is added so that frame 20 is slid over rod 99 via a feed hole 305. Polymer frame 20 can be slid over further rods via feed holes 305. Components 12, 13, 14 and 15 then can be stacked over the rod 99 as shown in FIG. 1, and finally cathode top plate 90 added to create the battery module 10. The anode 24 of a battery component 12, 13, 14, 15 thus can rest on the bipolar current collector 22 of the battery component 11, 12, 13, 14, respectively, below.

To create the FIG. 2 embodiment the rod 99 can be removed and housing 40 sides can be added and attached to the polymer frames. Liquid electrolyte can be added to the areas formed by the housing and two polymer frames if desirable to increase efficiency.

Figure 6:
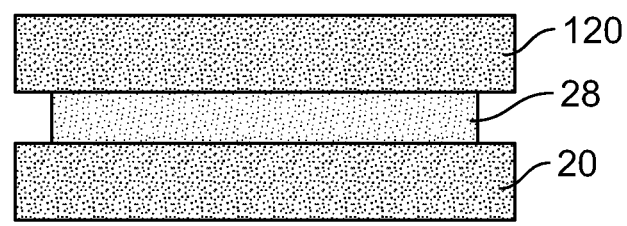
FIG. 6 shows a side view of a different embodiment of the battery component with two frames.

FIG. 6 shows a side view of a different embodiment of the battery component with an additional polymer frame 120 attached to the separator 28 opposite the polymer frame 20. This embodiment provides additional stability and protection.

Figure 7:
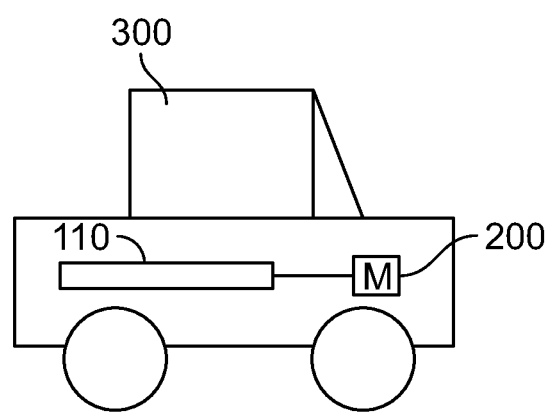
FIG. 7 shows schematically a electric or hybrid vehicle with an electric battery made of the battery module cells.

As shown in FIG. 7, in one application, the battery cell module or stack 110 can be created for example with a much larger number of battery cells for providing power as an electric battery to an electric motor 200 for powering an electric vehicle 300.

The resulting polymer frame stacked battery also allows the separation of anode and cathode in extra compartments and allows the usage of different anolytes and catholytes. For example, the one electrode side could have a liquid or gel-polymer type electrolyte and the second electrode side can use a solid-state electrolyte or even no electrolyte at all.

By attaching the separator-polymer frame unit to the housing the separator can no longer move or slide inside the cell. Therefore, this unit is more resilient and can better tolerate vibrations or shocks as they occur when having batteries in cars or any transportable device, because the position of the whole cell stack is fixed inside cell.

Likewise if the bipolar current collector-polymer frame unit embodiment is used, the bipolar current collector is well protected.

What is claimed is:

1. A battery stack comprising a first battery component comprising:
    a polymer frame having at least one window, the polymer frame having a first planar side and an opposite second planar side, and a window edge between the first and second planar sides;
    a separator; a bipolar current collector; a first electrode contacting a first planar surface of the separator, the first electrode contacting a first planar surface of the bipolar current collector; and
    a second electrode contacting a second planar surface of the separator; and
    a second battery component comprising a third electrode contacting a second planar surface of the bipolar current collector, the first electrode and third electrode both being a same one of one of an anode and a cathode and the second electrode material being the other of the anode and the cathode, the separator or bipolar current collector being attached to the first planar side of the polymer frame at an attachment, the separator or bipolar current collector attached to the first planar side being unsupported on a side opposite the attachment.

2. The battery stack as recited in claim 1 wherein the polymer frame is a dense foil, perforated foil, porous foil, adhesive tape or adhesive foil.

3. The battery stack as recited in claim 1 wherein the polymer frame is made of polyethylene or polypropylene.

4. The battery stack as recited in claim 1 wherein the polymer frame is attached at the separator with an overlap.

5. The battery stack as recited in claim 1 wherein the at least one window consists of a single window.

6. The battery stack as recited in claim 1 wherein the polymer frame is attached via gluing, welding, heat bonding, lamination or adhesive tape to the separator or bipolar current collector.

7. The battery stack as recited in claim 1 wherein the window has a shape of a rectangle, a rectangle with rounded edges, a circle, an oval or a triangle.

8. The battery stack as recited in claim 1 wherein the window has the shape of the rectangle or the rectangle with rounded edges.

9. The battery stack as recited in claim 1 wherein the first electrode is the cathode and is attached to the separator and protruding through the window.

10. The battery stack as recited in claim 1 wherein the polymer frame has at least one feed hole.

11. The battery stack as recited in claim 1 further comprising: a plurality of further battery components, each of the further battery component being configured as the first battery component.

12. The battery stack as recited in claim 11 further comprising a housing attached to the polymer frames of the first battery component and the plurality of further battery components.

13. A method for assembly the battery stack as recited in claim 1 comprising moving the first battery component as an individual unit via the polymer frame.

14. An electric vehicle battery comprising the battery stack as recited in claim 1.

15. An electric vehicle comprising the electric vehicle battery as recited in claim 14.

16. A battery stack comprising: a first battery component comprising:
    a polymer frame having at least one window, the polymer frame having a first planar side and an opposite second planar side, and a window edge between the first and second planar sides;
    a battery cell component having a separator and a bipolar current collector, a first electrode contacting a first planar surface of the separator, the first electrode contacting a first planar surface of the bipolar current collector; and
    a second electrode contacting a second planar surface of the separator; and
    a second battery component comprising a third electrode contacting a second planar surface of the bipolar current collector, the first electrode and third electrode both being a same one of one of an anode and a cathode and the second electrode material being the other of the anode and the cathode, the separator or bipolar current collector being attached to the first planar side or the window edge of the frame, the separator being a solid-state electrolyte.

17. The battery stack as recited in claim 16 wherein the polymer frame is a dense foil, perforated foil, porous foil, adhesive tape or adhesive foil.

18. The battery stack as recited in claim 16 wherein the polymer frame is made of polyethylene or polypropylene.

19. The battery stack as recited in claim 16 wherein the polymer frame is attached at the separator with an overlap.

20. The battery stack as recited in claim 19 wherein the separator or the bipolar current collector is attached to the first planar side.

21. The battery stack as recited in claim 16 wherein the at least one window consists of a single window.

22. The battery stack as recited in claim 16 wherein the polymer frame is attached via gluing, welting, heat bonding, lamination or adhesive tape to the separator or bipolar current collector.

23. The battery stack as recited in claim 16 further comprising a second polymer frame provided on another side of the separator opposite the polymer frame.

24. The battery stack as recited in claim 16 wherein the window has a shape of a rectangle, a rectangle with rounded edges, a circle, an oval or a triangle.

25. The battery stack as recited in claim 16 wherein the window has the shape of the rectangle or the rectangle with rounded edges.

26. The battery stack as recited in claim 16 wherein the first electrode is the cathode and is attached to the separator and protruding through the window.

27. The battery component as recited in claim 16 wherein the polymer frame has at least one feed hole.

28. The battery stack as recited in claim 1 further comprising: a plurality of further battery components, each of the further battery component being configured as the first battery component.

29. The battery stack as recited in claim 28 further comprising a housing attached to the polymer frames of first battery component and the plurality of further battery components.

30. The battery stack as recited in claim 16 wherein the solid state electrolyte is selected from the group consisting of lithium oxide, sulfide glass, and ceramic.

31. A method for assembly the battery stack as recited in claim 16 comprising moving the first battery component as an individual unit via the polymer frame.

32. An electric vehicle battery comprising the battery stack as recited in claim 16.

33. An electric vehicle comprising the electric vehicle battery as recited in claim 32.

34. A battery stack comprising a first battery component comprising:
   a polymer frame having at least one window, the polymer frame having a first planar side and an opposite second planar side, and a window edge between the first and second planar sides;
   a separator; a bipolar current collector; a first electrode contacting a first planar surface of the separator, the first electrode contacting a first planar surface of the bipolar current collector; and
   a second electrode contacting a second planar surface of the separator; and
   a second battery component comprising a third electrode contacting a second planar surface of the bipolar current collector, the first electrode and third electrode both being a same one of one of an anode and a cathode and the second electrode material being the other of the anode and the cathode, the bipolar current collector being attached to the first planar side or the window edge of the frame, the bipolar current collector being a foil including nickel.

35. The battery stack as recited in claim 34 wherein the polymer frame is a PP/PE frame, and the foil is a nickel-coated aluminum foil.

36. An electric vehicle battery comprising the battery stack as recited in claim 34.

37. An electric vehicle comprising the electric vehicle battery as recited in claim 36.

* * * * *